June 15, 1965     J. C. JAMISON, JR     3,188,677
ROTARY SCRAPER BLADE
Filed Feb. 7, 1963     2 Sheets-Sheet 1
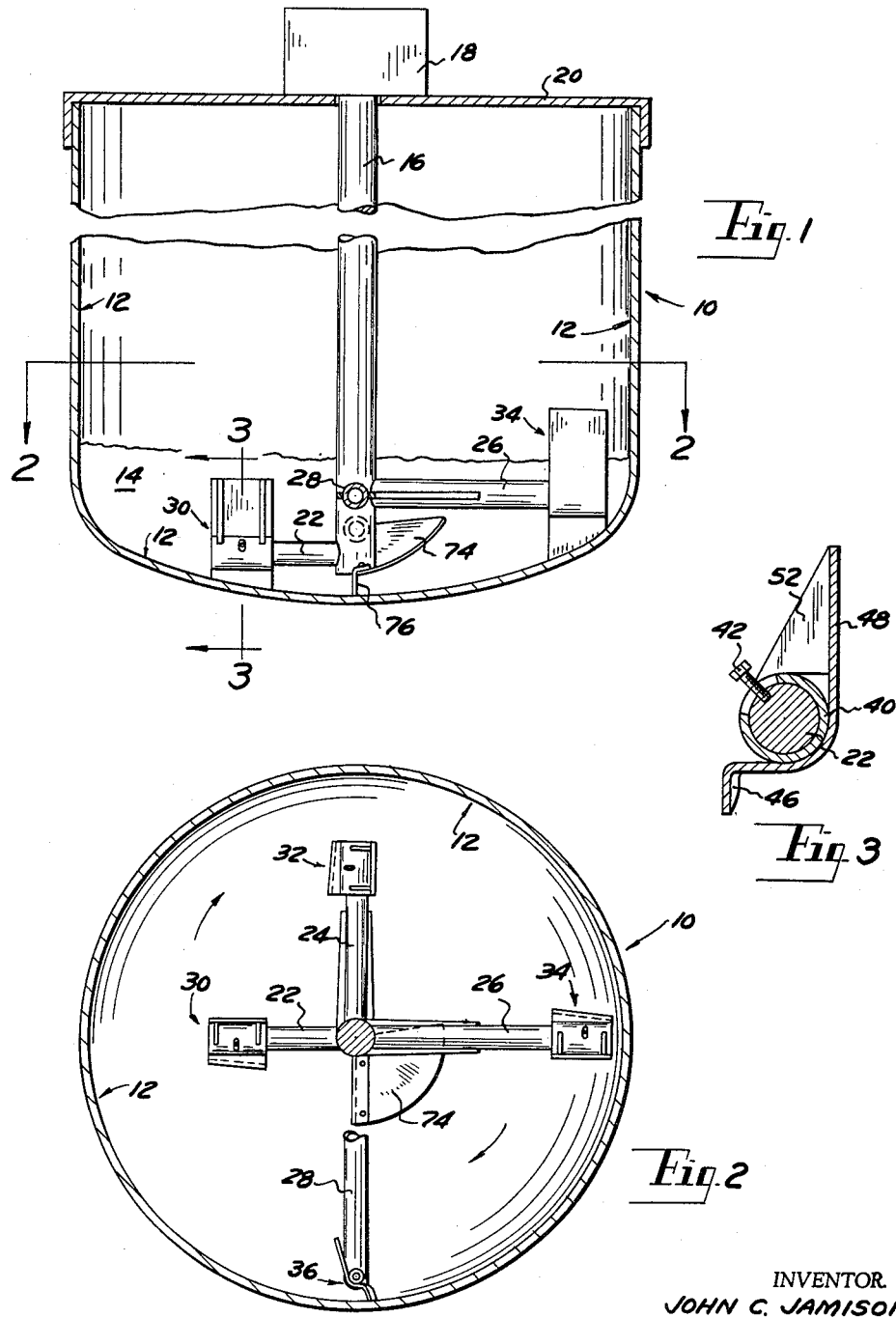
INVENTOR.
JOHN C. JAMISON JR.
BY
ATTORNEY June 15, 1965 J. C. JAMISON, JR 3,188,677
ROTARY SCRAPER BLADE
Filed Feb. 7, 1963 2 Sheets-Sheet 2

INVENTOR.
JOHN C. JAMISON JR.
BY
ATTORNEY.

United States Patent Office 3,188,677
Patented June 15, 1965

3,188,677
ROTARY SCRAPER BLADE
John C. Jamison, Jr., Detroit, Mich., assignor to Nelson Chemical Company, Detroit, Mich., a company of Michigan
Filed Feb. 7, 1963, Ser. No. 256,983
2 Claims. (Cl. 15—246.5)

This invention has reference to rotary scraper or doctor blades and more particularly to a pivoted blade adapted to be moved along the inner surface of a vat, tank or similar vessel in such manner as to prevent adhesion of material contained therein to the vat surface and to provide a mixing movement or circulation of this material.

Many tanks or vats in which material is stored or mixed must be periodically or continuously cleaned to prevent particles of the material from adhering to the inner walls of the tank and undergoing undesirable chemical changes which might have harmful effects on the remaining material in the tank. In addition, such material deposits may cause further adhesion and deposition of material until the vessel is substantially reduced in volumetric capacity. Where heat is transferred to or from the stored material through the walls of the vessel, the thickness of the walls becomes extremely critical. When material accumulates along the wall surfaces it tends to alter the insulating properties of the vessel walls. To compensate for this alteration in heat transfer efficiency, adjustments would have to be continually made in the temperature of the heat source or reservoir.

To eliminate such accumulations of material, scraper blades have been employed which move along the inner surface of the tank and scrape any adhering material off. The difficulty with such blades is that they are subject to breakage when an unyielding obstacle is placed in their path.

In addition, many tanks or vessels of this type are circular in configuration thus requiring that the blades be mounted on an arm etxending perpendicularly from a central rotating vertical post or column. The difficulty with this arrangement is that it is extremely difficult to construct a vessel so nearly circular in cross-section that the blade scrapes with equal force at all points along the vessel walls. In other words, eccentricities in the generally circular shape of the vessel tend to result in an uneven scraping force; some areas of the walls will be inadequately scraped while others may cause breakage of the scraper blade.

It is therefore an object of the present invention to provide a scraper blade of this type which applies a uniform scraping action of sufficient magnitude so as to remove ordinary deposits of material on the tank wall surface and which swings out of the path of an unyielding object or accumulation.

The present invention generally accomplishes this result by providing a blade pivotable about an axis along its center portion. A scraper portion extends from the pivot to the tank inner surface. A tail portion extends from the pivot in the direction opposite to the scraper portion. The blade is pivotable on an arm which rotates about a column at the center of the tank. The area of the scraper portion which moves forward into the stored material is in such relation to the corresponding area of the tail portion that when the arm is rotated about the center column, and the scraper portion contacts the tank wall surface, equal and opposite moments are exerted about the pivot in the blade. The blade is therefore maintained in position with the surfaces of the blade portion substantially perpendicular to the direction of movement of the blade. Ordinary accumulations of material on the tank walls do not provide sufficient moment forces to cause the blade to rotate about the pivot. However, when the blade meets an obstruction or accumulation of greater than average rigidity, the obstruction causes moment forces about the blade axis of such size that the blade rotates about the pivot out of the way of the obstruction.

Similarly, when the vessel circular cross-section is somewhat eccentric, the blade bears uniformly against the wall throughout its movement around the tank inner surface. Rotation of the blade about the pivot compensates at locations in the tank where the distance from the pivot to the wall surface is smallest; when this distance is at its maximum, the blade rotates so as to extend to the wall surface and exert a normal scraping force.

With the present device, it is therefore possible to remove ordinary accumulations of material and yet avoid the possibility of breakage of the blade due to eccentricities in the vessel configuration or when an unnatural accumulation or obstruction is situated in the blade's path. By adjusting the size of the moment in the pivot resistant to rotation of the blade, the device can be adapted to remove accumulations presenting resisting moments of various sizes.

It is therefore an object of the present invention to provide a scraper blade which can be adapted to "normal" accumulations of varying sizes and yet resistant to breakage from eccentricities in the vessel shape and from abnormally rigid accumulations or obstructions.

A further object is to provide such a device having relatively long life and requiring little or no maintenance.

Another object is to provide a system of such blades adapted to scrape the entire inner surface of the tank with which the stored material comes into contact.

Another object is to provide a device of this kind requiring relatively low construction and installation costs.

Other objects and advantages of the present invention will be more obvious from the following detailed description. The description makes reference to the drawings in which:

FIGURE 1 is a sectional elevational view of a tank in which several blades are employed;

FIGURE 2 is a sectional view taken along the lines 2—2 in FIGURE 1;

FIGURE 3 is a sectional view taken along the lines 3—3 in FIGURE 1;

Figure 4:
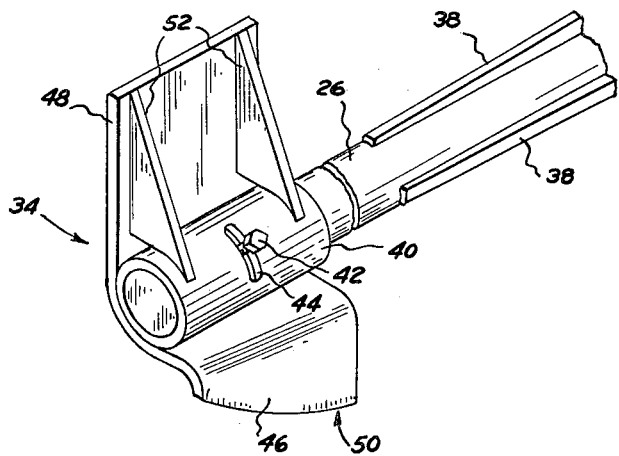
FIGURE 4 is a perspective view of one of the blades shown in FIGURE 1.

Referring to the drawings in detail, FIGURE 1 shows a tank 10 having an interior surface 12 in which material 14 is stored. A central column 16 extends vertically down into the center of the tank from a motor 18 mounted on the upper surface of a cover 20 which seals the upper portion of the tank.

Arms 22, 24, 26 and 28 of various lengths are rigidly connected to the central column 16 at various elevations along the column and extend horizontally outward therefrom. Adjacent arms are at right angles to each other as shown in FIGURE 2. Each arm terminates in a blade indicated generally at 30, 32, 34 and 36.

The configuration of arm 26 and blade 34 is illustrated in FIGURE 4. Ribs 38 extend along the length of the arm and provide additional rigidity and strength. A short section of hollow rod 40 fits over the end of the arm and is held in position by a pivot screw 42 which extends through a slot 44 in the rod and is screwed into the arm 36. The blade is formed of a single sheet of rigid material such as cast iron or steel and is bent to form a scraper portion 46 and a tail portion 48. The scraper portion has a curved edge 50 which matches the curved contour of the inner surface of the tank 10. A pair of struts 52 are fixed to the tail portion of the blade and the rod to provide additional strength. It can thus be seen that the entire assembly of rod 40, blade 34 and struts 52 is rotatable about the end of the arm 26.

Arms 22 and 24 and blades 30 and 32 are identical to arm 26 and blade 34 except that ribs are not shown in conjunction with arm 22; the latter is of such short length that such additional support is not necessary. These three blades contact the lower or bottom portion of the tank.

Figure 5:
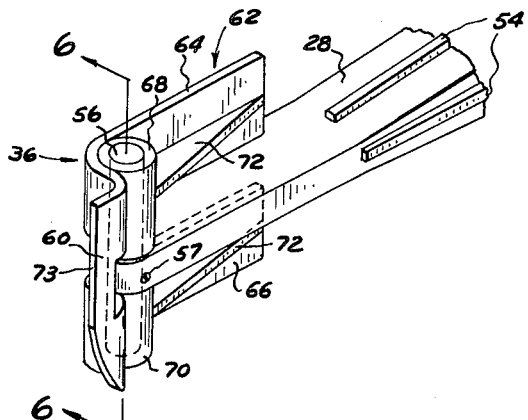
FIGURE 5 is a perspective view of a second blade shown in FIGURE 1.
Figure 6:
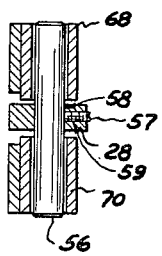
FIGURE 6 is a sectional view taken along the lines 6—6 in FIGURE 5.

Arm 28 and blade 36 are illustrated in FIGURES 6 and 5. The arm is provided with ribs 54 similar to those described above to give additional rigidity. A vertical pivot rod 56 is disposed in a hole 58 adjacent the end of the arm. A set screw 57 extends through a slot 59 in the arm and engages the pivot rod 56. The blade 36 is curved to form a scraper portion 60 and a tail portion 62. The tail portion consists of upper and lower sections 64 and 66 spaced apart at a distance equal to the vertical dimension of the arm 28. Two sections of hollow rods 68 and 70 are fixed to the blade 36 so as to fit on opposite sides of the arm. The hollow rods fit slidingly about the pivot rod 56. Horizontal struts 72 respectively support the upper and lower sections of the tail portion 62. It can thus be seen that the assembly including the blade 36, hollow rods 68 and 70, and struts 72, is rotatable about the fixed pivot rod 56. The scraping edge 73 of this blade contacts the side walls of the tank.

The area of the exposed faces of each blade 30, 32, 34 and 36 are such that the algebraic sum of the moments exerted on the blade about the respective pivoting axis by the force of the material in the tank and by the scraping resistance of the tank walls is zero. Since the pressure exerted by the stored material is constant across the entire blade, the forces exerted on the respective portions of the blade are a function of the areas of each portion. The moments exerted about the pivot are then the product of the forces exerted and the distance from the pivot axis to the point at which the force acts. The moment induced by the resistance of normal accumulations of material on the vessel walls may be so small as to have no effect on these calculations of area for purposes of obtaining algebraically balanced moments. On the other hand, if the resistance of the accumulated material is substantial, the effect of this resistance could be included in the calculations. Thus, by employing a blade having scraper and tail portions of suitable areas, the algebraic sum of the moments exerted about the pivot axis may be reduced to zero, where the scraper portion is contacting normal accumulations of material along the inner surface of the tank.

Continuous scraping of the blades against the walls of the tank tends to wear down the scraping edges 50 and 73. If the blades extend from the arm and contact the tank walls perpendicularly, eventually the scraper portions of the blades will be decreased in length due to the worn scraping edges. This would then require a periodic replacement of the blades; in addition, the efficiency of the scraping action would constantly be varying. Such variation in the resisting force of the tank wall would make it extremely difficult to construct blades in which the opposing moments are balanced.

As shown in FIGURE 2, the present device utilizes scraper blades in which the angle at which the forward face of the scraper portions of the blades (the face moving forward into the material in the tank) and the tank wall is less than ninety degrees. In this manner, wearing down of the edges 50 and 73 of the scraper blade does not reduce the efficiency of the scraping action; the edge is thus worn down along a beveled plane in the same manner as a conventional machine tool. This considerably prolongs the life of the blade and allows a constant force to be maintained on the blade edge by the scraping resistance of the tank wall.

When the areas of the respective portions of the blade conform to the above requirements, the blades will be maintained in normal scraping position provided that no eccentricity in the shape of the vessel or unusual obstruction or accumulation is encountered. If such an eccentricity or obstruction is met by the blade, the additional moment exerted by the wall or obstruction about the pivot axis will cause the blade to swing out of the way of the obstruction.

After the obstruction is passed, the balanced moments acting about the pivot axis will return the blade to normal scraping position. The slots 44 and 59, and screws 42 and 57, act as a stop in preventing the blade from revolving too far about the pivot axis. The blade is thus prevented from revolving so far about the pivot axis that the normal balance of moments cannot return the blade to scraping position.

In FIGURES 1 and 2 a helix-shaped member 74 is fixed between two adjacent arms 26 and 28. A scraper blade 76 is connected to the lower portion of the helix. The helix and blade serve both to scrape the central bottom section of the tank and to induce a spiral or rotary movement in the material in the tank as the arms revolve. It should be noted that it is not necessary to employ a rigid blade 76 with the helix. A pivotable blade of the type shown in FIGURE 4 could easily be employed in the manner described in conjunction with that illustration.

As illustrated in FIGURES 1 and 2, the system of scraper blades employed removes the accumulations of material from all of the inner surface of the tank that comes into contact with the stored material. If the level of stored material is higher, additional arms and blades could be employed in the same manner.

The rotary movement of the arms and blades produces a circulating and mixing motion in the material in the vessel. This substantially increases the efficiency of heat transfer through the vessel walls to the stored material and also aids in the mixing of that material.

It should be noted that the present scraping blade could be employed in a similar manner in a longitudinal vessel of the type commonly employing a ribbon blender. This could be accomplished by orienting the blades about a horizontal axis or column extending through the length of the vessel.

Having thus described my invention, I claim:

1. A scraper system for a vessel having a substantially circular side wall and a floor at the lower edge thereof, comprising:
    (a) a central column rotatable about its axis and extending along the axis of said vessel;
    (b) power means operable to rotate said column;
    (c) a plurality of arms of different lengths fixed along the length of said column and projecting outwardly therefrom;
    (d) at least one first blade rotatably mounted on one of said arms, to rotate about an axis substantially parallel to the axis of the column;
    (e) second blades rotatably mounted on others of said arms, respectively, to rotate about axes substantially parallel to radii extending from the column;
    (f) each of said first and second blades having a scraper portion extending between its rotational axis and the adjacent substantially parallel vessel inner surface, the edge of said scraper portion contacting said inner surface having the same contours as said surface, and a tail portion extending from said blade axis in the direction opposite to said vessel surface;
    (g) the respective areas of said scraper and tail portions being such as to permit rotary motion of the blade relative to the tank on encountering an abnormal accumulation or other obstruction;
    (h) the lengths of said arms and the spacing of said arms along said column being chosen to permit the scraping of the entire inner surface of said side walls and said floor.

2. The structure set forth in claim 1 including means for limiting the rotation of said blades about said axes in such manner that said blade returns to normal scraping position when obstructions are no longer in the path of said blade.

References Cited by the Examiner
UNITED STATES PATENTS

| | | | |
|---|---|---|---|
| 202,206 | 4/78 | Walker | 107—36 |
| 227,289 | 5/80 | Neal | 107—36 |
| 2,884,234 | 4/59 | Gebhart et al. | 15—246.5 X |

WALTER A. SCHEEL, *Primary Examiner.*